Dec. 11, 1928. H. R. YOUNG Re. 17,159

PISTON FOR INTERNAL COMBUSTION ENGINES

Original Filed Oct. 4, 1924

Inventor
Henry R. Young
Watson E. Coleman
Atty

Reissued Dec. 11, 1928. Re. 17,159

UNITED STATES PATENT OFFICE.

HENRY R. YOUNG, OF MUSKEGON, MICHIGAN.

PISTON FOR INTERNAL-COMBUSTION ENGINES.

Original No. 1,557,643, dated October 20, 1925, Serial No. 741,607, filed October 4, 1924. Application for reissue filed March 4, 1927. Serial No. 172,917.

This invention relates to pistons for internal combustion engines, and has for an important object thereof the provision of a piston in which the rings have at all times a sealing engagement with the coacting portions of the piston, so that there will be no leakage about the rings to permit passage of oil to the combustion chamber or fuel from the combustion chamber to the base.

An important object of the invention is to provide a piston of this character which may be very cheaply produced, and in which various parts may be applied to the piston after the manner of applying piston rings thereto.

A further object of the invention is to provide a device of this character eliminating the use of adjusting bolts, screws or the like which, due to wear, must be tightened from time to time and which, due to the likelihood of their loosening, must be the subject of constant attention.

A still further object of the invention is to provide a device of this character eliminating the use of springs and the like to provide the tension necessary for holding the sections in assembled relation.

These and other objects I attain by the construction shown in the accompanying drawings, wherein for the purpose of illustration is shown a preferred embodiment of my invention and wherein:—

Figure 1:
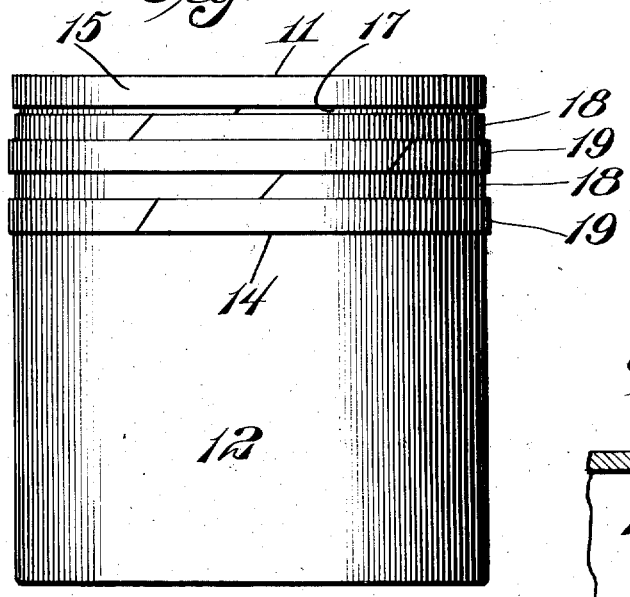
Fig. 1 is a side elevation of a piston constructed in accordance with my invention.

Referring now more particularly to the drawings, the piston consists of a head 11 and skirt portions 12 cast integrally with one another, the upper end of the skirt portion being reduced in diameter, as at 13, to thereby provide an upwardly facing shoulder 14. The exterior diameter of the head approximates the extreme diameter of the skirt, so that the head projects beyond the upper end of the reduced portion, as indicated at 15, and this projecting portion opposes a shoulder 14 thereby producing in the outer face of the piston a groove. The under surface of the projecting portion 15 of the head is inclined upwardly and inwardly, as shown at 16.

In accordance with my invention, I provide a plurality of rings for engagement in these grooves, these rings including an expander ring 17 having a beveled upper surface corresponding to the bevel of the inclined upper surface 16 of the projecting portion or flange 15 of the piston head. This expander ring has normally a diameter but slightly less than the outside maximum diameter of the cylinder and accordingly must be compressed to permit its insertion beneath the flange 15. This ring, as are the remaining rings hereinafter described, is split to permit the compression thereof. The rings further include piston rings 19 and may include spacer rings 18, the piston rings 19 being of any desired material or construction, and of the usual sizes for engagement with the walls of the cylinder in which the piston is to operate. The spacer rings 18 are of less diameter than the piston rings and adapted to be altered with the piston rings. In the application of these rings to the piston, a piston ring is first placed against the shoulder 14, then alternate spacer and piston rings applied. The expanding ring is placed beneath the flange 15 and has its inclined surface 17[a] bearing against the inclined surface 16. As this ring tends continually to expand and the two inclined surfaces are operating against one another, this ring will exert a continuous force downwardly causing the rings 18 and 19 to be held tightly against one another during operation of the engine. All of the rings 17, 18 and 19 are so constructed that when in applied position a slight space is left between their inner walls and adjacent wall of the reduced portion 13, so that a slight play is afforded for these rings permitting them to shift.

It will be obvious that by this construction the decided effect of maintenance of a seal between the spacers and rings of a piston of this type is secured by a means which will have a life equal to the life of the piston rings and spacers and one which will apply its tension without the need of outside adjustment.

It will furthermore be obvious that certain modifications of the structure hereinbefore set forth are possible without in any manner departing from the spirit of my invention, and I accordingly do not limit myself to such specific structure except as hereinafter claimed.

Figure 3:
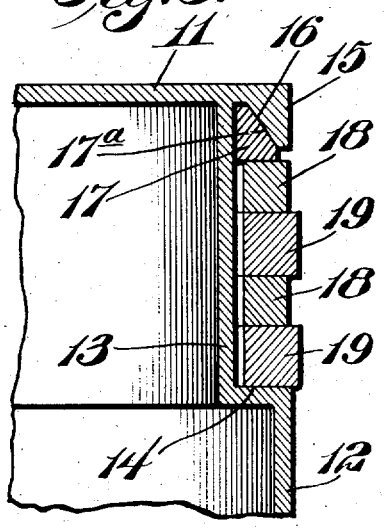
Fig. 3 is an enlarged vertical section of one side of the piston.
Figure 2:
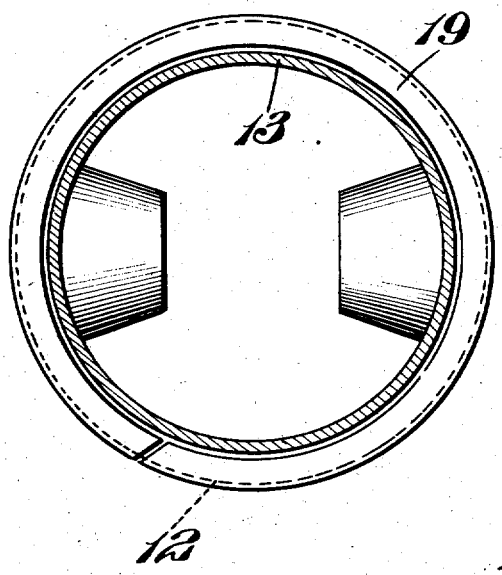
Fig. 2 is a transverse sectional view therethrough.
Figure 4:
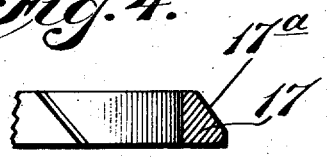
Fig. 4 is an enlarged sectional view taken through the tensioning ring.

This arrangement of the piston groove and the rings has important results. It will be noticed that the sealing ring 17 is of considerably less diameter than either the piston rings 19 or the spacing rings 18. Consequently, it always has clearance with respect to the cylinder walls, for when assembled in place, as shown in Fig. 3, this ring is considerably less in diameter than the piston skirt. The result of the undercut inner (or outer) wall of the piston groove in connection with the beveled periphery 17[a] of the sealing ring, and in connection with the always maintained clearance between this sealing ring and the cylinder, is that all the pressure of the sealing ring is directed on the ring assembly outwardly (downwardly) axially of the piston, thereby making an unusually effective seal in the groove without tending to force the piston rings outwardly against the cylinder walls to increase the friction and enhance the wear both of the piston rings and the cylinder walls.

In some of the claims I have referred to the ring assembly. This may or may not include the spacer rings. It may or may not include more than one piston ring, as the essential principles of my invention can measurably well be carried out with the single sealing ring and single piston ring.

I claim:

1. A piston and ring construction for use in a cylinder comprising a piston having a head and skirt portion, said skirt portion having a relatively wide circumferential groove, a closed rear wall for the groove, closed shoulders for the groove, one of said shoulders being substantially perpendicular to the skirt, and the other of said shoulders being undercut to provide a downwardly and outwardly slanting surface, a plurality of rings in this relatively wide groove including a plurality of sealing rings which normally expand outwardly to seal against the cylinder, all of said rings having sides substantially perpendicular to the skirt of the piston and resting one upon the other with one end ring resting upon the said shoulder which is substantially perpendicular to the skirt, and a compensating ring which is disposed in the said undercut and which has a slanting surface which contacts with the corresponding surface of the undercut, said compensating ring being outwardly expanding so as to pack the rings together tightly against the said perpendicular shoulder of the groove whereby the rings are tightly held between the said two shoulders and the rings effect a seal between themselves and the closed wall of the groove, while the outward expanding tendency of the rings to effect a sealing pressure with the cylinder walls remain substantially constant.

2. A one-piece piston having the skirt thereof reduced intermediate its ends to provide a groove forming opposing shoulders, the upper shoulder being undercut, a split resilient wedging ring opposing said shoulder and having an inclined face opposing the undercut portion of the shoulder and a plurality of split resilient rings arranged within said groove and between the first named ring and the shoulder at the opposite end of the groove, the last named rings including packing rings and spacers therefor, the first named ring constantly urging the last named rings toward the last named end of the groove, the shoulder at the last named end of the groove being square.

HENRY R. YOUNG.